Jan. 13, 1959
W. A. WEBB ET AL
2,867,863
LATCHING MECHANISMS
Filed April 2, 1952
4 Sheets-Sheet 1
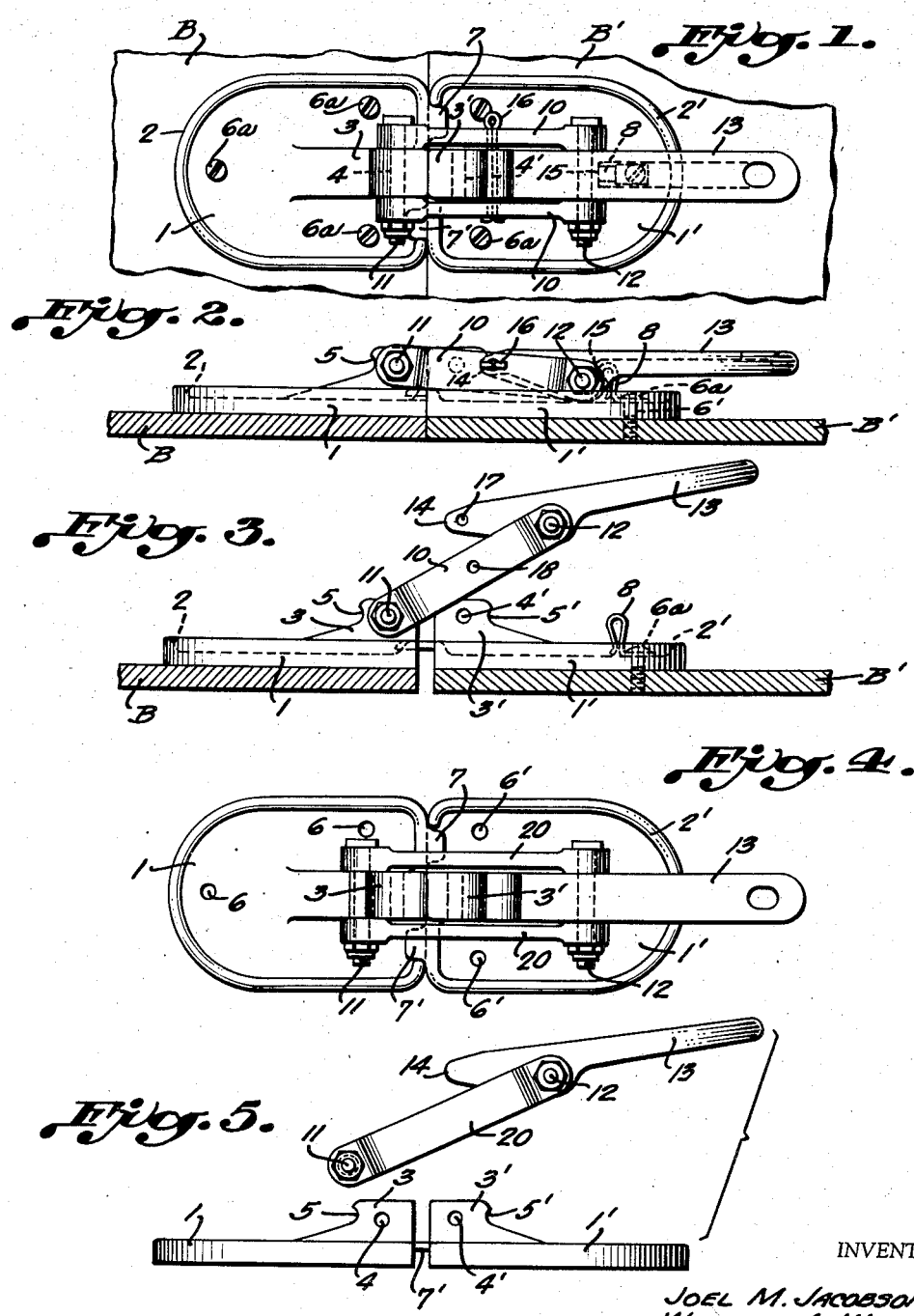
INVENTORS
JOEL M. JACOBSON
WILLIAM A. WEBB
BY Samuel Elonitz
ATTORNEY Jan. 13, 1959 W. A. WEBB ET AL 2,867,863
LATCHING MECHANISMS
Filed April 2, 1952 4 Sheets-Sheet 2

INVENTORS
JOEL M. JACOBSON
WILLIAM A. WEBB
BY
ATTORNEY

Jan. 13, 1959 W. A. WEBB ET AL 2,867,863
LATCHING MECHANISMS
Filed April 2, 1952 4 Sheets-Sheet 3

INVENTORS
JOEL M. JACOBSON
WILLIAM A. WEBB
BY
ATTORNEY

INVENTORS
JOEL M. JACOBSON
WILLIAM A. WEBB
BY Samuel Kelowsky
ATTORNEY

2,867,863

LATCHING MECHANISMS

William A. Webb and Joel M. Jacobson, Baltimore, Md., assignors to Aircraft Armaments, Inc., Baltimore, Md., a corporation of Ohio Application April 2, 1952, Serial No. 280,032

5 Claims. (Cl. 20—92)

This invention relates to a latch mechanism for the purpose of interconnecting or integrating structural parts of all types.

It is the object of the present invention to provide a latch mechanism which is rugged and economical in construction and is possessive of maximum strength requirements commensurate with the amount of metal used in the fabrication thereof, the parts of which may be cast, forged or machined, and which may be formed of magnesium, aluminum, steel or any other available metals in the industrial field.

It is another object of the present invention to provide a latch mechanism which is formed of few moving parts, and the parts of which are duplicative of each other, so that the components may be fabricated economically in large numbers and may be freely interchanged to adapt them to varying conditions in service.

It is a further object of the invention to provide a latch mechanism having positive indexing features so that the component parts of the mechanism may be positioned quickly and fastened rapidly. When in operative position the mechanism is capable of transmitting high shear loads in either direction normal to the base or parallel to the joining line by virtue of the indexing and positioning features.

It is a further object of the invention to provide a latching mechanism having features of adjustability in order to permit a wide latitude in manufacturing tolerances. This feature of adjustability also permits the latching mechanism to remain effective over long periods of time despite heavy wear.

It is a further object of the invention to provide a latching mechanism which is capable of rapid manipulation between its locking and unlocking positions by virtue of the pivotal movement of a handle assembly beyond a dead-center position. The invention makes further provision for a more positive locking of the latch mechanism in its over-center position whenever such additional securement is desirable or necessary by the provision of a spring acting on the handle assembly in the direction of its over-centered position.

Another spring may be provided to additionally secure the handle in its unlocked position in order to prevent undesired idle movements and dangling of the handle assembly. The most positive locking of the latch mechanism in its over-center position may be attained by additional transverse locking means exemplified by a cotter pin or similar lock.

It is another object of the invention to provide a latch mechanism adapted to fasten together continuous edges of structural members. This fastening may embody a plurality of fully detachable handle assemblies which may serve to connect continuous edges of structural members by the interposition of such locking assemblies at any desired displacement in dependence upon the load requirements. Either fully detachable handle assemblies or pivoted assemblies may also be applied along the edges at predetermined displacements whereat are disposed special mountings for the handle assemblies.

The invention proceeds upon the principle of utilizing a pair of identical base plates formed with identical counterparts with which are designed to cooperate handle assemblies of different types to effect a tight connection between the identical base plates and the structural parts on which they may be mounted. Each base plate is provided with opposed abutments, each of which abutment is capable of accommodating one end of the handle assembly for pivotal movement. The handle assembly consists of a link and a pivoted handle, and one end of the link may be pivotally mounted to one of the abutments through a bore extending therethrough or may pivotally engage an undercut seat provided on the exterior of the abutment. The handle of the handle assembly is pivoted to the opposite end of the link and the tip of the handle is designed to be swung by an over-center movement into a seat of the abutment disposed opposite to the abutment which pivotally mounts the link of the handle assembly. The toggle action or over-center movement of the handle makes possible an effective latching of the base plates together by the handle and link pressing the two abutments together.

The under-face of the handle may be provided with a seat for the purpose of receiving a spring clip mounted on the locking base plate to press the end of the handle more tightly against its abutment seat to obtain even a tighter locking action. Furthermore, a spring clip on the pivoting base plate may be used to lock the handle in its inoperative position to prevent undue idle motion and dangling of the handle assembly in its inoperative position.

A positive and the most effective locking of the handle assembly in its over-center position may be attained by the extension of a cotter pin through aligned apertures in the link and the handle when the same are in locked position, which prevents an unintentional return movement of the handle assembly.

The handle may be provided with an adjustable tip to control the effective length of the handle beyond its pivot point in order to obtain a tighter locking action, which permits a freer latitude in permissible manufacturing tolerances of the assembly. This adjustment may also be used for providing compensation for wear in the course of use of the latching mechanism.

The identical base plates may each be provided with a lug projecting beyond the meeting edge of the respective plate on the same side of the abutment extending upwardly therefrom, so that when the identical base plates are disposed in opposed relation, each will overlap the opposite base plate, and in connection with the upstanding abutments therebetween will effectively withstand high shearing stresses in either direction normal to the base plate or along a line parallel to the joint line between the meeting edges.

In some instances, the latch mechanism may be used at spaced points along continuous meeting edges for the purpose of connecting structural members to which such meeting edges may be joined by any mode of attachment such as welding, riveting, adhesion, etc. The handle assemblies may be of the type which is pivoted to one of the abutting sides or may be of the completely detached type. Furthermore, the meeting edges may be reenforced by abutments which are continuous so that the handle assemblies of the detachable type may be fastened therealong at any desired displacement.

Other objects and purposes will appear from the following detailed description of the invention, taken in conjunction with the accompanying drawings, wherein—

Fig. 1 is a plan view of our improved latch mechanism in its locked position;

Fig. 2 is a front elevation of Fig. 1;

Fig. 3 is a front elevation of Fig. 1 with the parts in disengaged position;

Fig. 4 is a plan view of a second embodiment of the invention in its locked position in which the handle assembly is completely detachable;

Fig. 5 is a front elevation of Fig. 4 with the parts in disengaged position;

Figure 6:
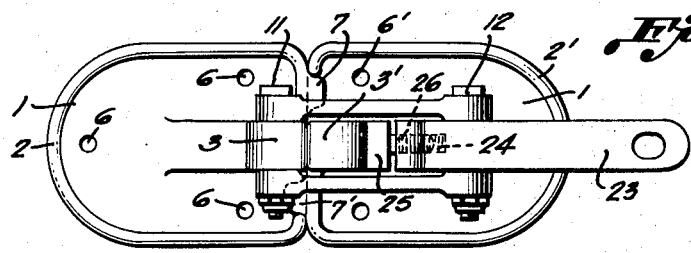
Fig. 6 is a plan view of the embodiment shown in Fig. 1 incorporating in addition an adjustable handle.

In Figs. 1 to 3 is shown the basic assembly of the improved latching mechanism in accordance with the present invention which may be modified in several respects without departing from the spirit of the invention.

The identical base plates 1 and 1' are preferably cast from aluminum, magnesium, steel or other metals and each may be provided with a reenforcing bead 2 and 2', respectively, on its upper face around its entire boundary with the exception of the edge whereat it is juxtaposed to its companion base plate. An abutment 3 extends upwardly from the base plate 1 at its meeting edge, and a corresponding abutment 3', is formed on the base plate 1'. The abutments 3 and 3' are disposed medially of the base plates leaving space on each side thereof for the accommodation of an indexing or positioning lug extending from each base plate in overlying relation to the other one. Thus, lug 7, forming a protuberance from the bead 2, extends over the surface of the base plate 1' between the upper terminal of the beading 2' and the abutment 3'. Similarly, an identical lug 7' is formed integrally with base plate 1' and overlies the body of base plate 1 between the lower terminal of the beading 2 and the abutment 3. The base plate 1 is drilled with a plurality of holes 6 and likewise the base plate 1' is drilled with a plurality of holes 6' to enable the attachment by means of bolt or rivet fasteners 6a of the respective base plates to structural base members B and B', which are adapted to be fastened together by the provision of the latch mechanism in accordance with the present invention.

The abutment 3 is bored with an opening 4 in a direction parallel to the joint between the base plates for the accommodation of a bolt therethrough and an undercut seat 5 is formed externally of the abutment on the side opposite its meeting edge. A similar bore 4' and seat 5' are provided in the abutment 3' on the companion base plate 1'.

The base plates 1 and 1' described above are actually identical structural parts and the functional cooperation between them is attained by their opposed disposition on the base members B and B'.

The handle assembly for effecting the latching between the base plates 1 and 1' may be applied reversibly to the two base plates. As shown in the drawing, this handle assembly consists of a link formed by two congruous link bars 10 having openings adjacent the opposite ends thereof. A bolt 11, capped with a nut, may be threaded through the opening 4 in abutment 3 with the corresponding ends of the pair of link bars 10 in contact with the opposite ends of the abutment 3. A bolt 12, capped with a nut, connects the opposite end of the link bars 10 and pivotally mounts medially thereof a handle 13. This handle, provided with a locking end 14, has a rounded outline corresponding to the seat 5' in the abutment 3', and when the base plates 1 and 1' mounted on the structural units B and B' are brought in close relationship, as shown in Fig. 3, the link bars 10 may be rocked in a clockwise direction to bring the end 14 of the lever 13 within the seat 5' which, when followed by a clockwise rocking of the arm 13 serves to throw the pivotal axis of the handle at 12 below the line of the axes at 4 and 5'. This toggle or rocking beyond a dead center position, serves to latch together the base plates 1 and 1' until such time that the handle 13 is rocked in a counterclockwise direction to bring its pivotal axis above the line extending from the axes at 4 and 5'.

In order to prevent an unintentional unlatching of the mechanism once it has been brought into the position shown in Figs. 1 to 3, apertures 18 may be bored in the link bars 10 in alignment with an aperture 17 in the tip end of the handle through which may be passed a cotter pin 16 to fasten the parts together in their locked position.

Figure 8:
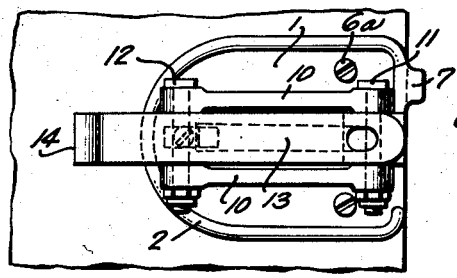
Fig. 8 is a plan view of the embodiment of the invention shown in Fig. 1 with retaining means for the locking handle in its idle or disengaged position.
Figure 9:
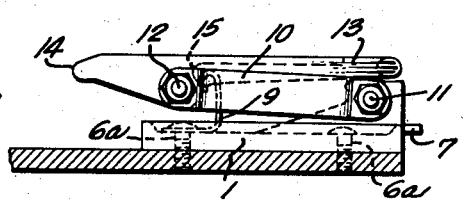
Fig. 9 is a front elevation of Fig. 8.

The underside of the handle 13 may have a seat 15 formed therein at the right of the pivotal axis 12 for the purpose of additionally controlling the action of the handle 13 in both its operative and inoperative positions. A clip spring 8 mounted on the base plate 1' by means of the fastening bolt 6a serves to exert a yielding pressure against the seat 15 of the handle to force the tip end 14 more tightly against the seat 5' in the abutment 3'. A more secure locking effect is attained by means of spring 8 to prevent inadvertent unlatching, especially when the mechanism is mounted in inverted position. This spring lock is less positive than the cotter pin 16 above. A similar although not identical spring 9 (Figs. 8 and 9) may be mounted on base plate 1 by means of the fastening bolt 6a so that the effective end of this spring may press resiliently within seat 15 in the handle to prevent the handle from dangling or moving idly while the latch is in its inoperative position. This mounting of the spring 9 is shown in Figs. 8 and 9 which illustrate more clearly than do Figs. 1 to 3 the mounting of the base plate 1 with the handle folded thereover in its idle position.

The handle assembly described above, cooperating with the abutments 3 and 3' could be reversed by threading the bolt 11 through the bore 4' and by seating the end 14 of the handle 13 in the seat 5 of abutment 3. With such a reversal it would only be necessary to interchange clip springs 8 and 9 if such springs were being used.

A second embodiment of the invention is illustrated in Figs. 4 and 5. This embodiment utilizes the same base plates 1 and 1' as illustrated in Figs. 1 to 3, 8 and 9. A slight change is made in the handle assembly by the utilization of longer link bars 20 than the links 10, whereupon it is possible to pivotally mount the free end of the link by seating the mid-portion of bolt 11 within external seat 5 of abutment 3. The engagement of the bolt 11 with the seat 5 is sufficiently secure to enable a clockwise rocking of the link 20, followed by a clockwise rocking of the handle 13 while the end 14 is seated in 5' to bring the pivotal axis 12 beyond the line of said axes 5 and 5' to effect the latching of the assembly in a manner similar to that described in connection with the first embodiment.

This embodiment of the invention may also be provided with cotter pin locking and spring retaining means for the handle as described above.

The protuberances 3 and 3' may be provided with bores 4 and 4' if it is desired that the base plates in this embodiment be adaptable to a handle assembly which may be pivoted in one of the abutments.

Figure 7:
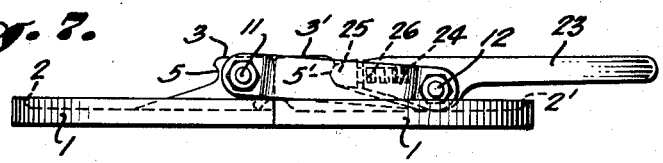
Fig. 7 is a front elevation of Fig. 6.

In Figs. 6 and 7 is illustrated an adjustable handle which may be adapted to the latch assemblies described above. The handle 23 is formed in two parts. A locking tip 25 is provided with a bolt portion 26 which may be threaded into a bore 24 within the handle 23 to adjust the effective length of the handle from its pivotal axis at 12 to its locking tip end, whereat it engages the seat 5' in the abutment 3'. Thus, the length of the handle may be varied to obtain any desired degree of tightness without imposing strict tolerances in fabricating standards. The pitch of the threads of the bolt 26 within the bore 23 may be selected to control the fineness of the adjustment. While the tip 25 may be threaded loosely within the bore 24 of the handle, so that it will align itself with the seat 5' when the handle is swung into operative position, the tip may be locked in adjusted position by means of a simple plate spring lock.

The base plates 1 and 1' may be applied to structural assemblies of all types including containers and covers therefor, fastening elements between building structures, etc. However, in some structural installations it is desirable or necessary to obtain a continuous reenforcement along the latched edges. In such instances the base plates assume the form of continuous sheets C and C' which are attached to the structural units by means of bolting, riveting, adhesion or other modes of fastening. These sheets may be provided at spaced points therealong with opposed sets of abutments 3, 3' similar to the corresponding abutments described above on the single base plate members. Handle assemblies, consisting of pivoted link and handles are provided for each set of abutments 3 and 3' to provide the necessary latching forces between the structural members being joined.

Figure 10:
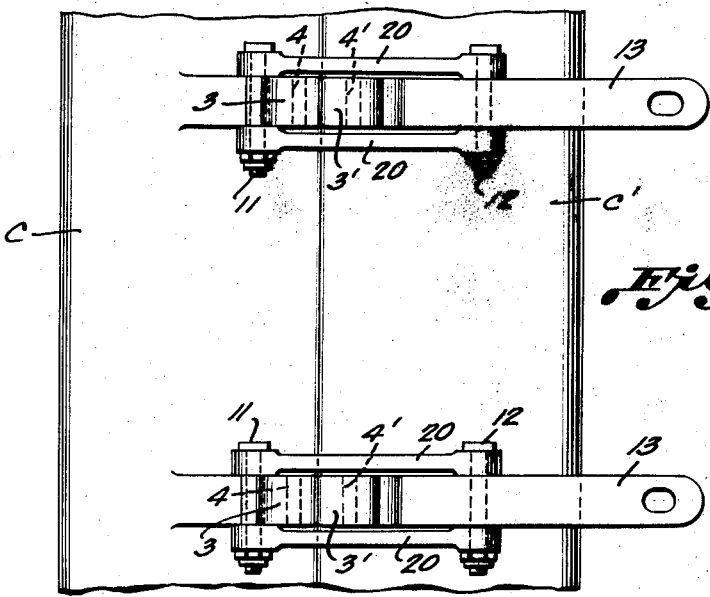
Fig. 10 is a plan view of the latch mechanism applied to continuous base plates and embodying detachable handle assemblies of the type shown in the embodiment of Figs. 4 and 5.
Figure 11:
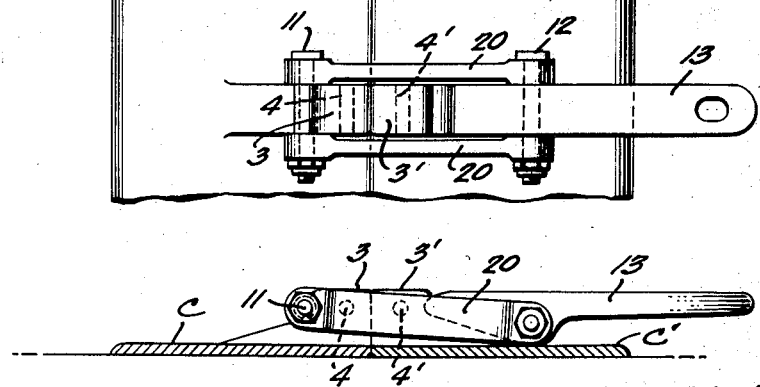
Fig. 11 is a front elevation of Fig. 10.
Figure 14:
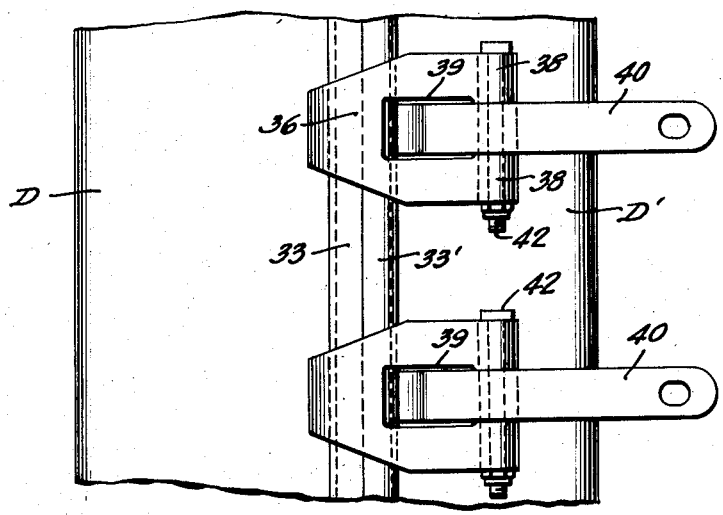
Fig. 14 is a plan view of a different embodiment of latch mechanisms applied to continuous base plates provided with continuous reenforced edge members which may accommodate any desired number of completely detachable handle assemblies along the full length thereof.
Figure 15:
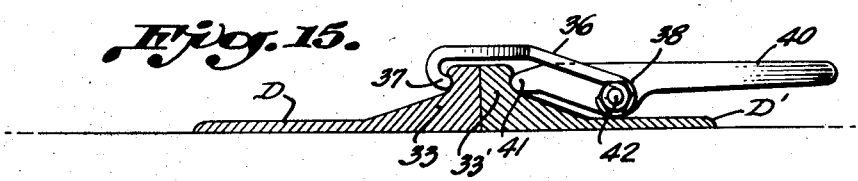
Fig. 15 is a front elevation of Fig. 14 showing the parts in locked position.
Figure 16:
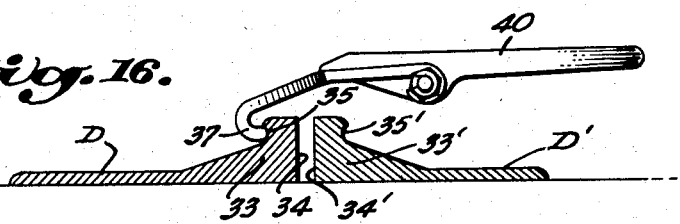
Fig. 16 is a view corresponding to Fig. 15 with the parts in partially assembled relation.
Figure 17:
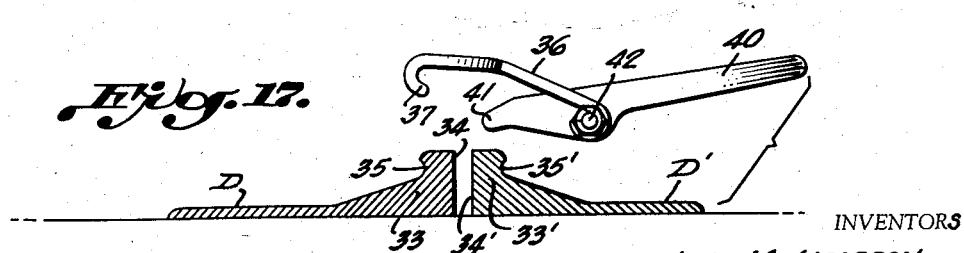
Fig. 17 is a front elevation of Fig. 14 showing the completely detachable handle assembly in fully disengaged position.

Figs. 10 and 11 show the handle assemblies similar to the handle assembly shown in Figs. 4 and 5 wherein these assemblies are fully detachable and easily reversible between right and left positions.

Figure 12:
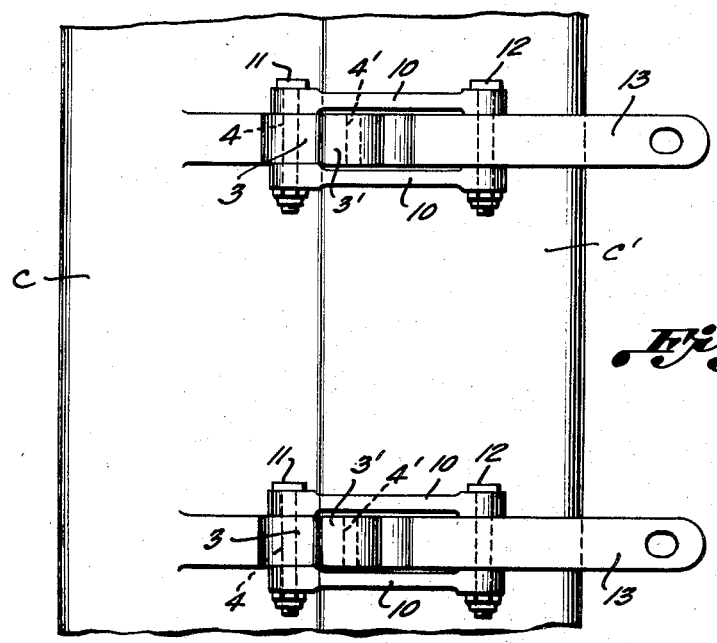
Fig. 12 is a plan view of the latch mechanism applied to continuous base plates and embodying pivoted handle assemblies of the type shown in Figs. 1 to 3.
Figure 13:
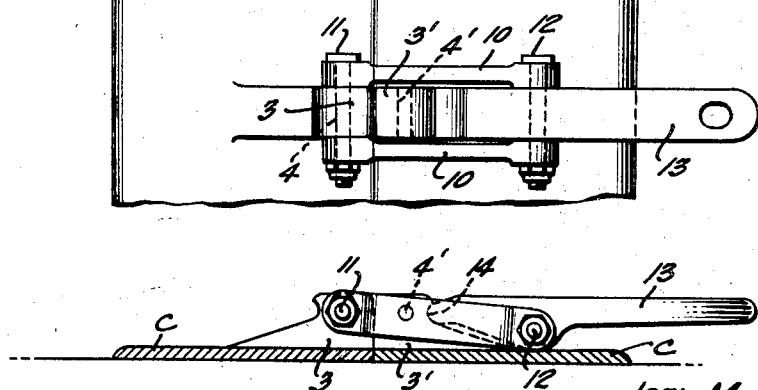
Fig. 13 is a front elevation of Fig. 12.

Figs. 12 and 13 show a similar continuous base plate provided with abutments 3 and 3' at a predetermined spacing therealong wherein the link and handle assemblies are identical to that shown in the first embodiment of Figs. 1 to 3 wherein one end of the link is pivotally mounted in a bore in one of the abutments.

Another form of continuous edge reenforcement with latching means therefor is shown in Figs. 14 to 17. In this form of the invention the continuous base plates D and D' are provided with continuous reenforcing abutments 33 and 33', respectively, forming juxtaposed meeting edges 34 and 34'. An undercut seat 35 is formed in the abutment 33 and a corresponding undercut seat 35' is formed in the opposite abutment 33'. As shown in Figs. 14 to 17, a special handle assembly is used to latch the parts together. This handle assembly consists of a sheet metal link 36 terminating at one end in a hook 37 and at the opposite end in a pair of looped ends 38 embracing the opposite ends of a bolt 42. The intermediate part of the link 36 has an opening 39 adjacent to the bolt for the purpose of pivotally mounting the handle 40 between the looped ends 38 of the link. The handle 40 is provided with a tip 41 having a contour corresponding to the undercut seats 35 and 35'. Thus, when hook 37 of the link 36 is brought into engagement with the seat 35, and the link is turned in a clockwise direction followed by a clockwise turning of the handle 40 to bring the axis 42 below the line joining the seats 35 and 35', which over-centering movement is well illustrated in the successive illustrations shown in Figs. 17, 16 and 15, the base plates D and D' are effectively latched together.

The handle assembly may be easily detached by a reverse movement of the handle 40 in a reverse direction. One or more of the handle assemblies may be reversely applied by engaging hook 37 into seat 35' and by manipulating the handle as described above.

The continuous abutments 33 and 33' make possible the application of the latches at any desired spacing depending upon the stresses being encountered.

While the base plates D and D' may be cast similarly to the base plates 1 and 1' and C and C', the continuous abutments enable the plates to be fabricated by extrusion procedures. Plastics may be employed in lieu of metals in some fields of application.

The base plates shown in Figs. 14 to 17 are adapted for use with handle assemblies of the type shown in the embodiments described above when such are of the fully detachable type, for example, as shown in Figs. 4 and 5 and 10 and 11. Furthermore, cotter pin locking may be used with the handle assemblies illustrated in the embodiments shown in Figs. 10 to 17 and may incorporate adjustable handles of the type shown in Figs. 6 and 7 if such feature is found desirable. Retaining clip springs for the handle in both operative and inoperative positions may be applied to the continuous edge forms shown in Figs. 10 to 13, particularly when the fastening bolts for the plates coincide with the placement of the handle latching assemblies.

While we have described our invention as embodied in specific forms and as operating in specific manners for purpose of illustration, it should be understood that we do not limit our invention thereto, since various modifications will suggest themselves to those skilled in the art without departing from the spirit of our invention, the scope of which is set forth in the annexed claims.

We claim:

1. A latch mechanism comprising a pair of duplicate and identical base plates disposed adjacent to each other in opposed relation, identical abutments protruding upwardly from said base plates, a lug formed on each said base plate at one side of said abutment and projecting to overlie the opposite base plate, a handle assembly for clamping together said base plates in tight juxtaposed relation comprising a link having one end thereof pivotally engaging the abutment on one of said base plates, a handle pivotally connected to the opposite end of said link, and a seat formed in the end of the abutment on the other one of said base plates remote from the first abutment for receiving the end of said handle by an over-center movement of the handle assembly relative to pivotal mounting of said link on said first-mentioned abutment.

2. A latch mechanism as set forth in claim 1 and having aligned openings extending transversely through said link and said end of said handle to receive a transverse locking member when said handle is in its over-center position to lock the handle assembly against unintentional return movement.

3. A latch mechanism comprising a pair of duplicate and identical base plates disposed adjacent to each other in opposed relation, identical abutments protruding upwardly from said base plates, a handle assembly for clamping together said base plates in tight juxtaposed relation comprising a link having one end thereof pivotally engaging the abutment on one of said base plates, a handle pivotally connected to the opposite end of said link, a movable tip on said handle and means for adjusting the effective length of said handle beyond the pivotal axis thereof, and a seat formed in the end of the abutment on the other one of said base plates remote from the first abutment for receiving the tip end of said handle by an over-center movement of the handle assembly relative to the pivotal mounting of said link on said first-mentioned abutment.

4. A latch mechanism comprising a pair of duplicate and identical base plates mounted co-planarly adjacent to each other in opposed relation with aligned identical abutments projecting upwardly from said base plates centrally of their meeting edges, a lug projecting beyond the meeting edge of each base plate at one side of the respective abutment in overlying relation to the opposite plate, a handle assembly for clamping together said base plates in tight juxtaposed relation comprising a link formed by a pair of congruous bars, a cylindrical bolt extending transversely to said bars for connecting the corresponding ends of said bars together, means for pivotally mounting said bolt on one of said abutments, a handle pivotally connected to the opposite end of said bars, and a seat formed in the end of the abutment on the other one of said base plates remote from the meeting edges thereof for receiving the end of said handle by an over-center movement of the handle assembly relative to the pivotal mounting of said link on said first-mentioned abutment.

5. A latch mechanism comprising a pair of duplicate and identical base plates mounted co-planarly adjacent to each other in opposed relation, aligned identical abutments projecting upwardly from said base plates at the midpoints of the meeting edges thereof, a reenforcing bead extending around the upper boundary of each base plate to the exclusion of its meeting edge, a lug projecting beyond said meeting edge from said bead at one side of each base plate to overlie the opposite base plate adjacent to its respective abutment, a handle assembly for clamping together said base plates in tight juxtaposed relation comprising a link formed by a pair of congruous bars, a cylindrical bolt extending transversely to said bars for connecting the corresponding ends of said bars together, means for pivotally mounting said bolt on one of said abutments, a handle pivotally connected to the opposite end of said bars, and a seat formed in the end of the abutment on the other one of said base plates remote from the meeting edges thereof for receiving the end of said handle by an over-center movement of the handle assembly relative to the pivotal mounting of said link on said first-mentioned abutment.

References Cited in the file of this patent

UNITED STATES PATENTS

| | | |
|---|---|---|
| 899,084 | Thoits et al. | Sept. 22, 1908 |
| 1,863,524 | Hewitt | June 14, 1932 |
| 2,054,105 | Thomas | Sept. 15, 1936 |
| 2,087,733 | Lockhart | July 20, 1937 |
| 2,275,551 | Perrin | Mar. 10, 1942 |
| 2,287,661 | Bone et al. | June 23, 1942 |
| 2,334,240 | Bockhouse | Nov. 16, 1943 |
| 2,342,848 | Endter | Feb. 29, 1944 |

FOREIGN PATENTS

| | | |
|---|---|---|
| 233,701 | Great Britain | Dec. 31, 1925 |
| 236,792 | Great Britain | of 1925 |
| 658,547 | France | of 1929 |